United States Patent
Shaw et al.

(10) Patent No.: US 7,432,928 B2
(45) Date of Patent: Oct. 7, 2008

(54) USER INTERFACE STATE RECONFIGURATION THROUGH ANIMATION

(75) Inventors: Han-Yi Shaw, Redmond, WA (US); Shavinder S. Multani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 11/151,790

(22) Filed: Jun. 14, 2005

(65) Prior Publication Data

US 2006/0282786 A1 Dec. 14, 2006

(51) Int. Cl.
*G06T 13/00* (2006.01)
*G06T 15/70* (2006.01)
*G06F 3/048* (2006.01)
*G06F 3/14* (2006.01)

(52) U.S. Cl. ............... 345/473; 715/817; 715/818; 715/819; 715/820; 715/864

(58) Field of Classification Search ......... 715/817–820, 715/864; 345/473
See application file for complete search history.

(56) References Cited

U.S. PATENT DOCUMENTS

| | | | | |
|---|---|---|---|---|
| 5,204,947 A * | 4/1993 | Bernstein et al. | ............ | 715/854 |
| 5,615,384 A * | 3/1997 | Allard et al. | ................ | 715/800 |
| 5,914,717 A * | 6/1999 | Kleewein et al. | ............ | 715/843 |
| 6,049,336 A * | 4/2000 | Liu et al. | ..................... | 715/830 |
| 6,549,220 B1 * | 4/2003 | Hsu et al. | .................... | 715/854 |
| 6,956,574 B1 * | 10/2005 | Cailloux et al. | ............. | 345/473 |
| 6,980,200 B2 * | 12/2005 | Goren | ........................ | 345/169 |
| 7,017,122 B1 * | 3/2006 | Lee et al. | ..................... | 715/812 |
| 7,124,373 B1 * | 10/2006 | Patil | ........................... | 715/779 |
| 7,134,095 B1 * | 11/2006 | Smith et al. | ................. | 715/860 |
| 2002/0101450 A1 * | 8/2002 | Magendanz et al. | ......... | 345/764 |
| 2003/0151633 A1 * | 8/2003 | George et al. | ............... | 345/864 |
| 2003/0169298 A1 * | 9/2003 | Ording | ........................ | 345/810 |
| 2003/0237043 A1 * | 12/2003 | Novak et al. | ............. | 715/500.1 |
| 2004/0070629 A1 * | 4/2004 | Seifert | ........................ | 345/810 |
| 2004/0177319 A1 * | 9/2004 | Horn | ........................ | 715/501.1 |
| 2004/0196313 A1 * | 10/2004 | Wynn et al. | ................. | 345/779 |
| 2004/0210849 A1 * | 10/2004 | Becker | ........................ | 715/815 |
| 2004/0233201 A1 * | 11/2004 | Calkins et al. | ............. | 345/473 |
| 2004/0268259 A1 * | 12/2004 | Rockey et al. | ............. | 715/708 |
| 2004/0268260 A1 * | 12/2004 | Rockey et al. | ............. | 715/708 |
| 2005/0177801 A1 * | 8/2005 | Vronay et al. | ............. | 715/828 |
| 2005/0231512 A1 * | 10/2005 | Niles et al. | .................. | 345/473 |
| 2005/0283765 A1 * | 12/2005 | Warren et al. | ............... | 717/131 |
| 2006/0031776 A1 * | 2/2006 | Glein et al. | ................. | 715/779 |
| 2006/0253801 A1 * | 11/2006 | Okaro et al. | ................. | 715/810 |
| 2007/0226204 A1 * | 9/2007 | Feldman | ........................ | 707/5 |
| 2007/0250899 A1 * | 10/2007 | Rhodes et al. | .............. | 725/136 |

OTHER PUBLICATIONS

Massimo Guccione; "Microsoft Outlook bar;" Oct. 12, 1999; http://web.archive.org/web/19991012185520/http://dynamicdrive.com/dynamicindex1/outbar/index.htm.*
Microsoft Office Outlook 2003, Help File "About the Navigation Pane," (http://office.microsoft.com/en-us/outlook/HP010378651033.aspx).*

* cited by examiner

*Primary Examiner*—Ulka Chauhan
*Assistant Examiner*—Crystal Murdoch
(74) *Attorney, Agent, or Firm*—Vierra Magen Marcus & DeNiro LLP

(57) ABSTRACT

The size of a tool displayed in a user interface can be dynamically adjusted based on the current needs of the tool. When the user chooses a new function to perform using the tool, the tool's size and appearance is adjusted to an interface tailored for the selected function. To minimize confusion to the user, these dynamic adjustments can be performed using animation effects.

13 Claims, 9 Drawing Sheets

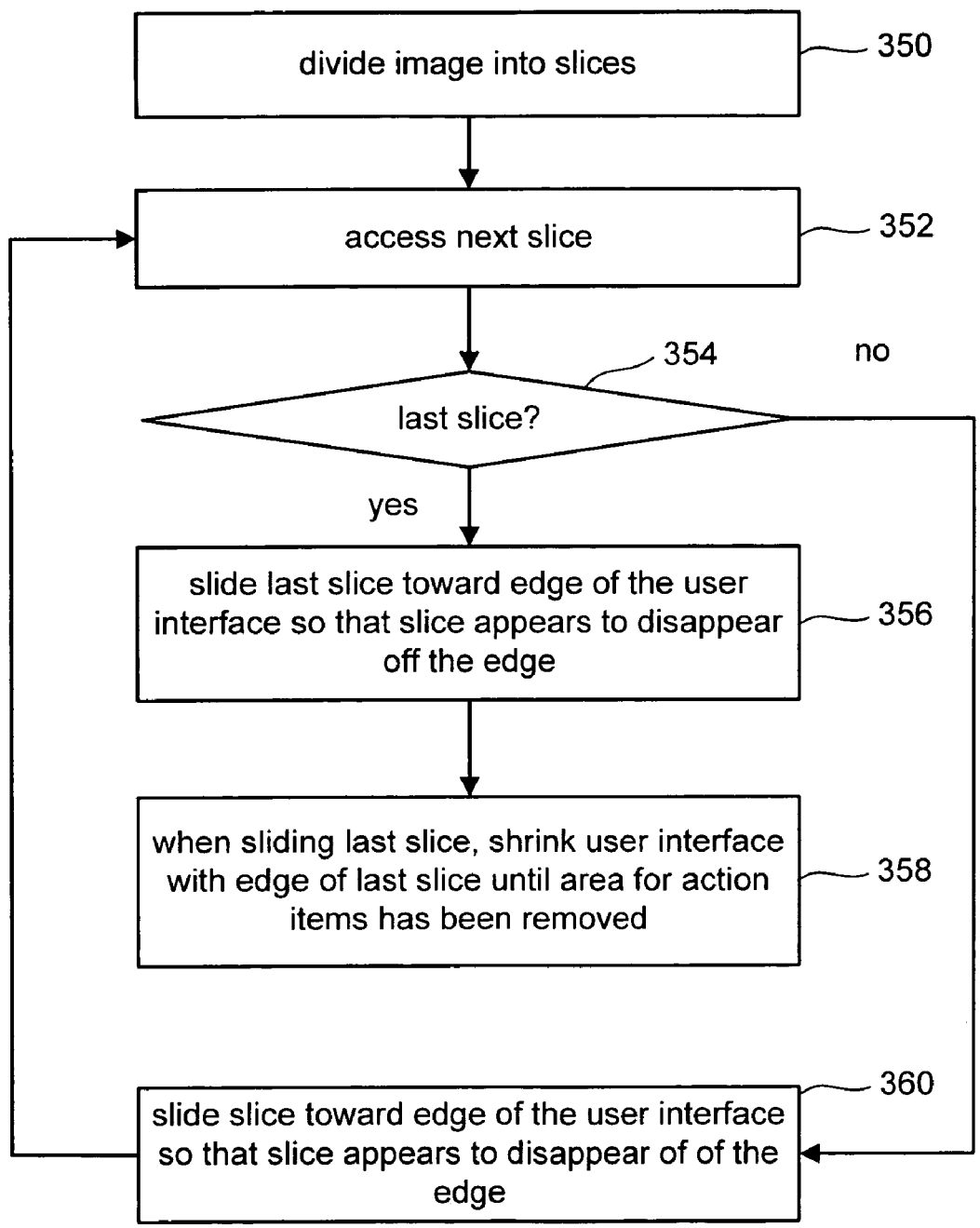

USER INTERFACE STATE RECONFIGURATION THROUGH ANIMATION

BACKGROUND

Many electronic devices make use of a graphical user interface (also referred to as a GUI). For example, personal computers use a GUI that may employ one or more windows. Handheld devices, cellular telephones and other devices can also use a GUI.

Many of these graphical user interfaces employ tools to perform various functions. For example, some systems may make use of formatting palettes and toolbars. The size of the tools on the display device (e.g., monitor or other device) is typically chosen to match the largest area needed to display any of the functions of the tool. As more functions are added to existing tools, the size of the tool on the GUI can become large and unwieldy.

Tools that include multiple functions typically include some means for selecting one of the functions. For example, function selection may made by selecting a tab, selecting a button, interacting with a menu, using a dial, using a slider, etc. Once the function is selected, the tool may adapt its appearance to provide the necessary user interface items associated with the tools. For example, consider a tool that provides various functions such as document formatting and configuration selection. The tool may operate as a window with a set of tabs. If the user wants to use the document formatting function, then the user will choose the document formatting tab which causes the window to display the items associated with the document formatting (e.g., buttons to change font, color, size, etc.). If the user wants to change configuration information, then the user may select the options tab which causes the window to display the items associated with selecting configuration (e.g., selection tools to indicate configuration settings). As the complexity of the functions increases, the switching between displays of the various functions can become confusing to a user.

SUMMARY

The size and content of a tool can be dynamically adjusted based on the current needs of the tool. When the user chooses a new function to perform using the tool, the tool's size and appearance is adjusted to an interface tailored for the selected function. Because the interface is customized for the selected function, the user interface for the tool need not be any larger than necessary. To minimize confusion to the user, these dynamic adjustments can be performed using animation effects so that one state of the user interface for the tool appears to morph into another state of the user interface for the tool.

One embodiment includes displaying a user interface in a first state associated with a first function. The user interface includes multiple function selectors (e.g., tabs) and a first set of one or more items (e.g., buttons, sliders, menus, etc.) associated with the first function. The items are used to perform actions associated with the functions (e.g., a font selector may be used with a document formatter). After displaying the user interface, a request is received to change the user interface to a second state associated with a second function. In response to the request, the user interface is changed from the first state to an intermediate stage using animation to remove the first set of items. While in the intermediate stage, the number, size, placement, or other property of the function selectors may optionally change. This change can also be animated. After any changes to the function selectors, the user interface changes from the intermediate stage to the second state using animation to add a second set of one or more items to the user interface.

For example, a row of equally distributed tabs displays several options for a user to select. When the user selects an option, in addition to taking the user to the corresponding user interface represented by each tab, the row of tabs themselves reconfigure to show a possibly different number of available tabs, while readjusting the size of each tab for the appropriate appearance. For example, each of the tabs may shrink or expand in size, some tabs may be eliminated, and/or new tabs may be added. Animation is used to add/remove items to/from the tool bar and to expand/shrink the toolbar from the single row of tabs to the size needed to display the new items associated with the destination toolbar.

The technology described herein can be accomplished using hardware, software, or a combination of both hardware and software. The software used is stored on one or more processor-readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special-purpose processors. In one embodiment, software is used to program one or more processors. The one or more processors can be in communication with one or more storage devices, peripherals and/or communication interfaces.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a flow chart describing an embodiment of a method for animating a user interface from an initial state to a first intermediate state.

DETAILED DESCRIPTION

A consolidated multi-purpose tool is provided that reconfigures itself to accommodate different types of functionality. When the user chooses a new function to perform using the tool, the tool's size and appearance is adjusted to an interface tailored for the selected function. Animation is used to reconfigure the tool in order to minimize confusion and disorientation caused by abrupt transitions or flashes during which a graphical element switches from one visual configuration to another, provide instant visual feedback of the user interaction thereby reducing the need for users to rely on repeated exposure and deductive ability to interpret causal changes on the screen, and elevate the user interface element from a mere picture on the screen to a tangible entity which provides a more realistic interaction.

Figure 1:
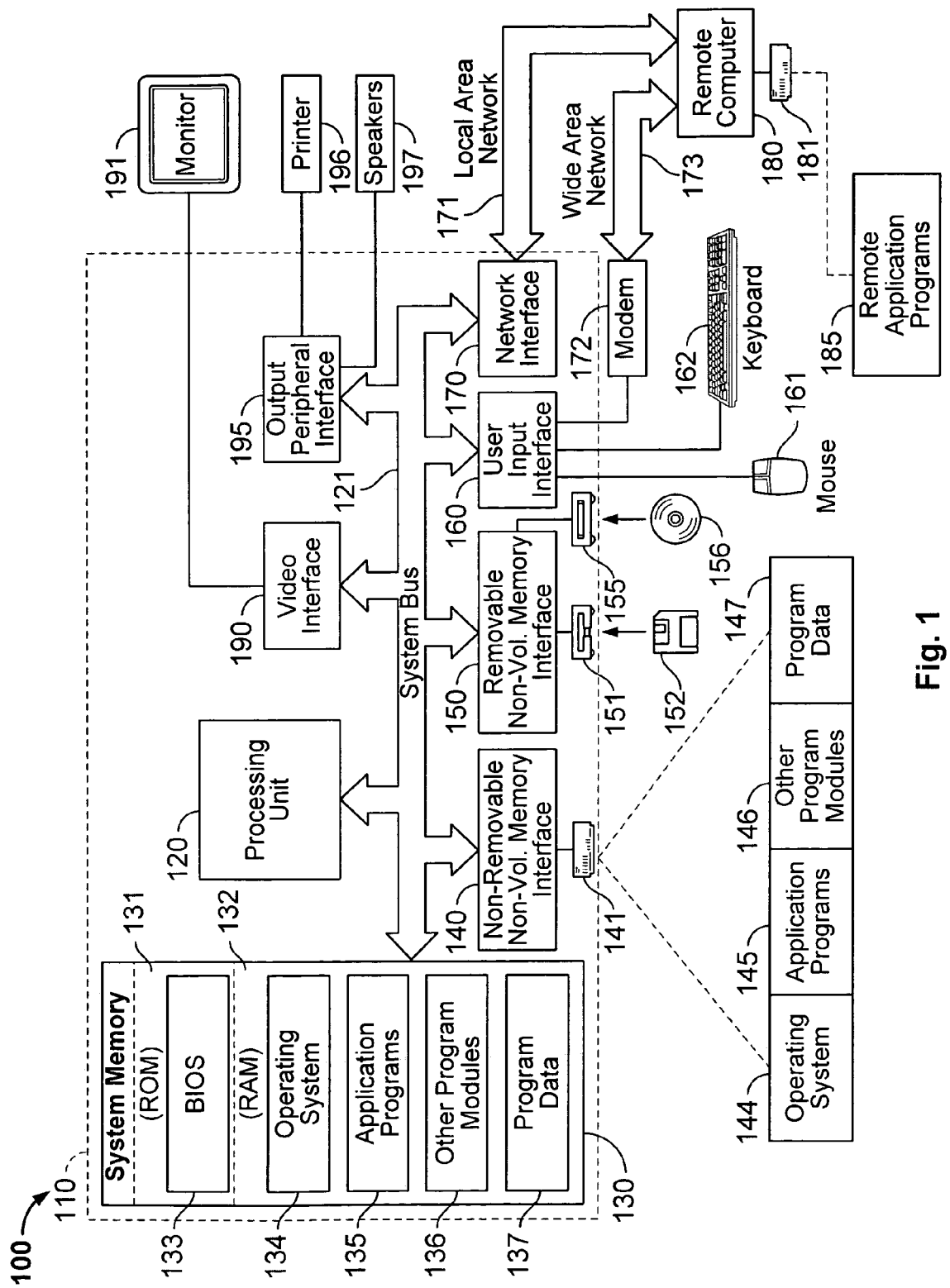
FIG. 1 is a block diagram depicting one example of a computing system for implementing the user interface described herein.

FIG. 1 illustrates an example of a suitable general computing environment 100 that may be used to implement a user interface that uses tools that can be adjusted dynamically using animation. The computing system environment 100 is only one example of a suitable computing environment and is not intended to suggest any limitation as to the scope of use or functionality of the technology described herein. Neither should the computing environment 100 be interpreted as having any dependency or requirement relating to any one or combination of components illustrated in the exemplary operating environment 100.

The user interface is operational with numerous other general purpose or special purpose computing system environments or configurations. Examples of well known computing systems, environments, and/or configurations that may be suitable for use include, but are not limited to, personal computers, server computers, hand-held or laptop devices, personal digital assistants, telephones (wired, wireless, or cellular), multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be implemented in distributed computing environments where tasks are performed by remote processing devices that are linked through a communications network. In a distributed computing environment, program modules may be located in both local and remote computer storage media including memory storage devices.

With reference to FIG. 1, an exemplary system includes a general purpose computing device in the form of a computer 110. Components of computer 110 may include, but are not limited to, a processing unit 120 (which can include multiple processors), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable, and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172, network interface or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
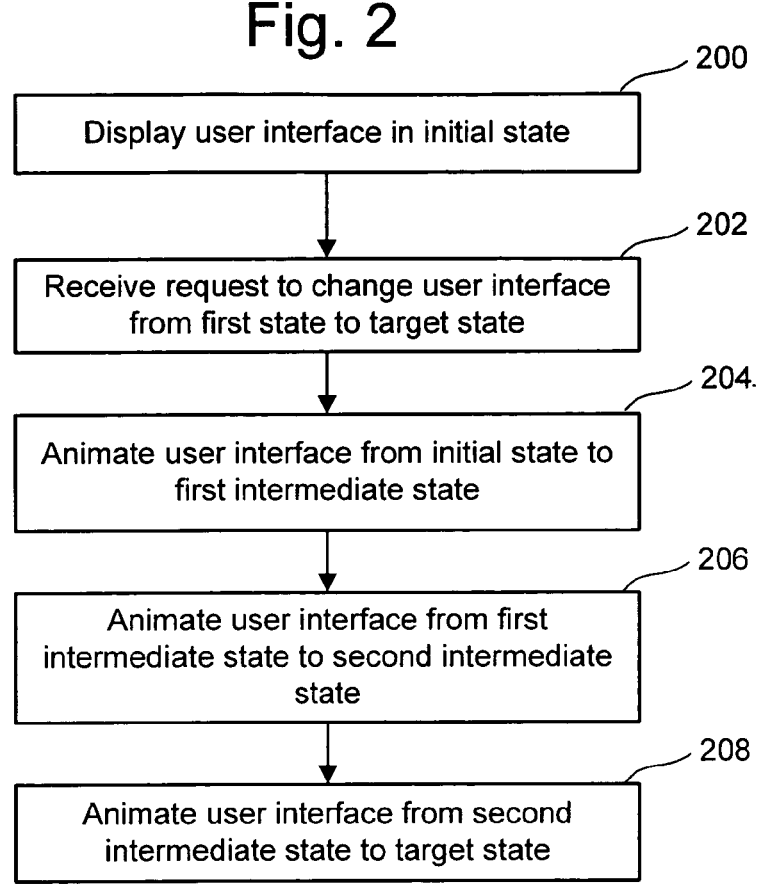
FIG. 2 is a flow chart describing one embodiment of a method for operating a user interface.
Figure 3:
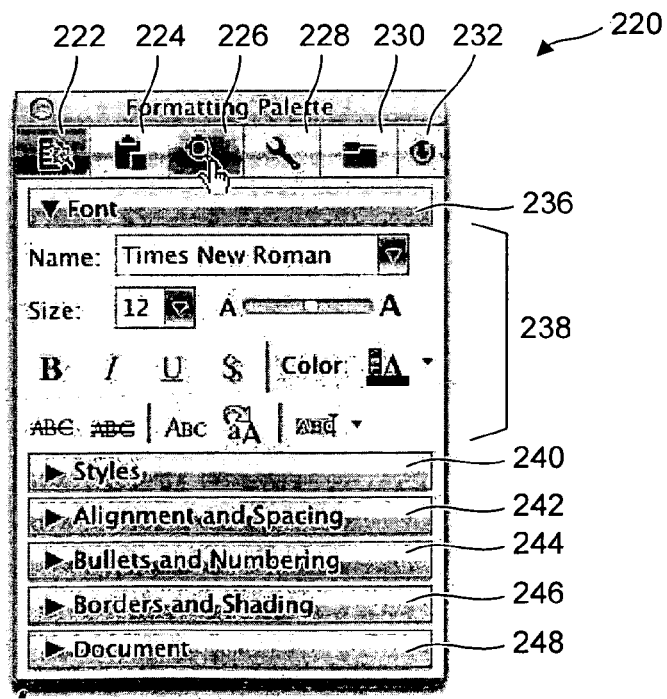
FIG. 3 is an example of a user interface.

FIG. 2 is a flow chart describing one embodiment of a method for operating a user interface, including changing the appearance of the user interface using animation. In step 200, the system displays the user interface. FIG. 3 provides an example of a user interface 220 that is displayed as a window. This window can be displayed by itself, within a bigger window or in another manner. The user interface is used for a tool that includes multiple functions, such as formatting, maintaining a scrapbook, providing reference tools, determining compatibility, managing projects and customizing. User interface 220 includes a set of function selectors, which in one embodiment includes tabs 222, 224, 226, 228, 230 and 232.

Tab 222 is used to select the formatting function. Tab 224 is used to select the compatibility determination function. Tab 226 is used to select the reference tools. Tab 228 is used to select the customizing function. Tab 230 is used to select the scrapbook function. Tab 32 is used to maintain projects. In other embodiments, other function selectors can be used.

Each function selector is associated with a set of action selectors that are used to performs actions for the selected function. FIG. 3 depicts the user interface after tab 222 has been selected. Therefore, a set of action selectors associated with the formatting function is displayed. For example, action selectors 236, 240, 242, 246 and 248 are displayed. By choosing one of the action item selectors, additional action items associated with the chosen action item selector are displayed. In FIG. 3, action selector 236 was chosen and action items 238 are displayed. Action items 238 include buttons and menus for choosing formatting options (e.g., font, size, bold, italics, underline, color, strike through, etc.). In one example, the user interface of FIG. 3 corresponds to the Formatting Palette used with Microsoft® Office 2004 for Mac.

Looking back at FIG. 2, in step 202 the system receives a request to change the user interface from an initial state to a target state. For example, the user may request that the user interface change from the state associated with the formatting function (depicted in FIG. 3) to the state associated with the reference tools function. In one embodiment, the request is made by a user who selects tab 226. In other embodiments, the request can be made by typing in commands or the user performing other actions. In some embodiments, the request can be provided by a software process or other hardware. The request can be automated or manually provided.

In response to the request received in step 202, the system changes the user interface from the initial state to an intermediate stage using animation. The intermediate stage is a temporary stage between the initial state and the target state. In one embodiment, the intermediate stage includes multiple intermediate states for performing additional animations. For example, in step 206, the system changes the user interface from the first intermediate state to the second intermediate state using animation. In other embodiments, more or less than two intermediate states can be used. In step 208, the system changes the user interface from the second intermediate state to the target state.

In the example of FIG. 3, the user interface includes function selectors and action items. In one embodiment, the animations of steps 204 and 208 change the action items and the animation of step 206 changes the function selectors. For example, the animation of step 204 can be used to remove the action items associated with the function of the initial state of the user interface. In this alternative, the intermediate stage includes function selectors, but not action items. The animation of step 206 can be used to change the function selectors. For example, function selectors can be removed, added or changed to become appropriate for the target state. Additionally, the animation of step 206 may include the resizing, changing shape, or otherwise changing of the underlying user interface. Changes to the function selectors can include resizing, moving, changing color, changing shape, etc. The animation of step 208 includes adding the action items for the target state.

Figure 4:
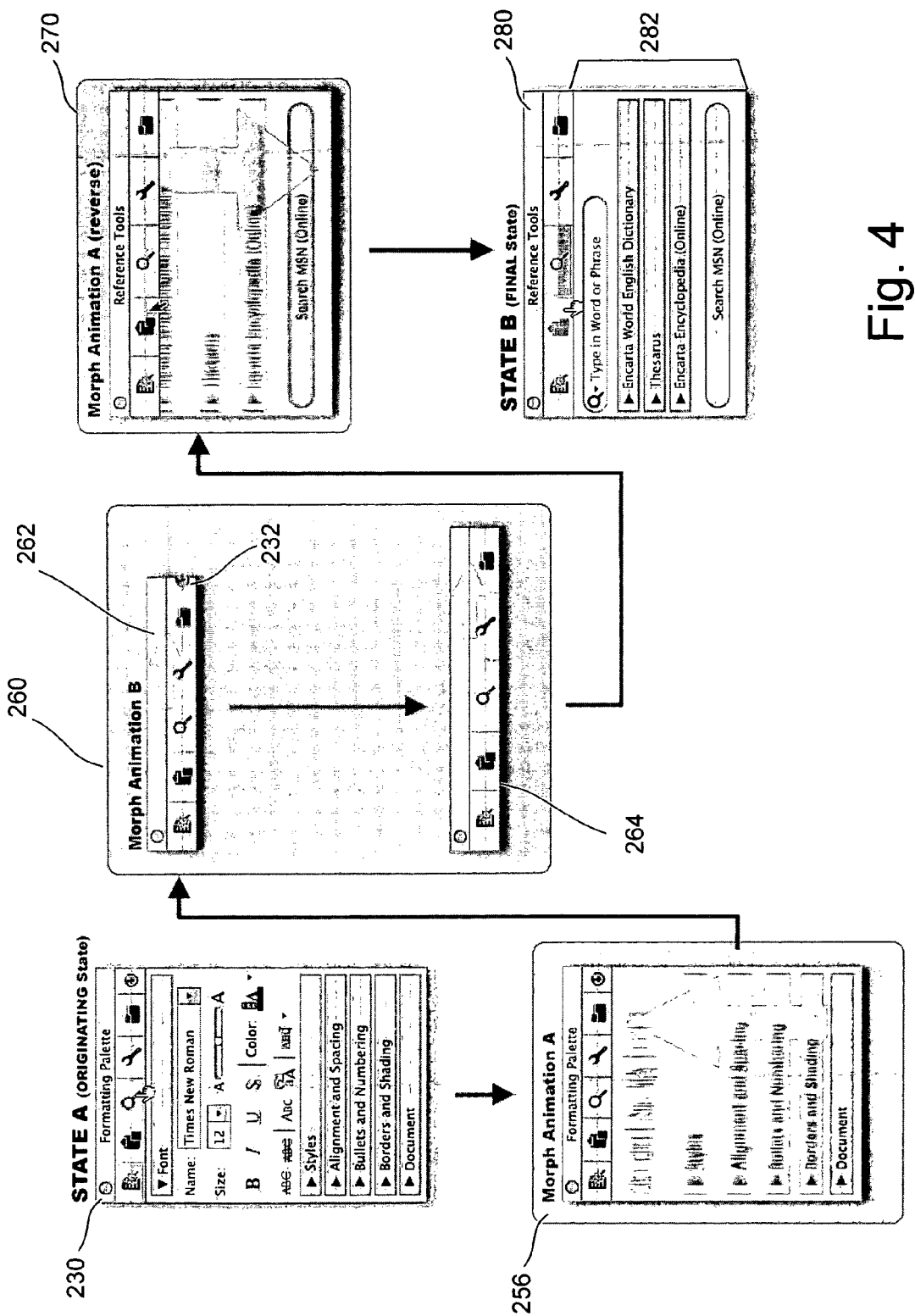
FIG. 4 depicts the transformation of a user interface using animation.

FIG. 4 provides a graphical depiction of one example of changing the user interface of FIG. 3 from the initial state 230 associated with the formatting function to a target state 280 associated with the reference tool function. After the user selects tab 226 (see FIG. 3) in step 202, the user interface will be changed to the intermediate stage 260 using animation. One example of suitable animation is depicted by reference numeral 256. In this example, the animation removes the action items by first stretching (e.g., blurring) the items and then sliding them up into the top of the user interface so they appear to slide off the user interface.

Intermediate stage 260 includes two intermediate states 260 and 264. In this example, the initial state uses six function selectors while the target state only uses five function selectors. Additionally, the user interface is wider in the target state than in the initial state. Therefore, in step 206, the user interface changes from intermediate state 260 to intermediate state 264 by animating function selector 232 to slide off the user interface and animating the remaining function selectors to become wider. For example, 6 tab controls morph into 5 tab controls. Note that in other implementations, function selectors can be added, narrowed, or otherwise changed.

In step 208, the user interface changes from intermediate state 264 to target state 280 using the animation depicted by reference numeral 270. In one embodiment, the animation makes the action items looked stretched as they slide on the user interface to their final positions, Once in the target state 280, the user can select a function selector and transform the user interface to another state using the same steps described above. Note that in one example implementation, the entire set of animations for changing the user interface from the initial state to the target state take less than one second.

There are various methods for performing the animation of step 204. In one embodiment, the animation for removing the action items is performed in a non-linear fashion. That is, all of the action items are not animated at the same time, at the same rate. A first subset of action items are animated first. The remaining action items wait their turn to be removed using the animation.

Figure 5:
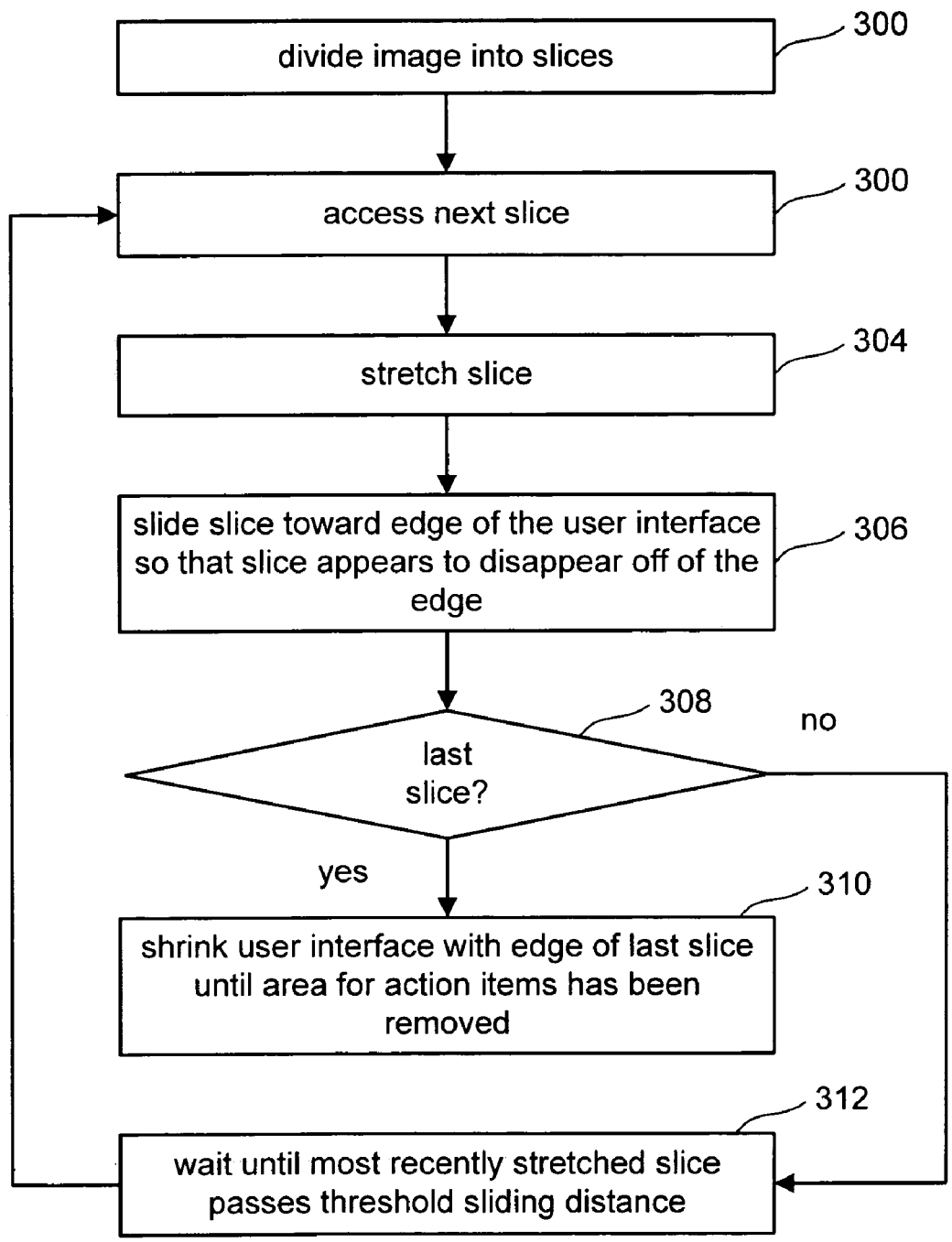
FIG. 5 is a flow chart describing an embodiment of a method for animating a user interface from an initial state to a first intermediate state.
Figure 5A:
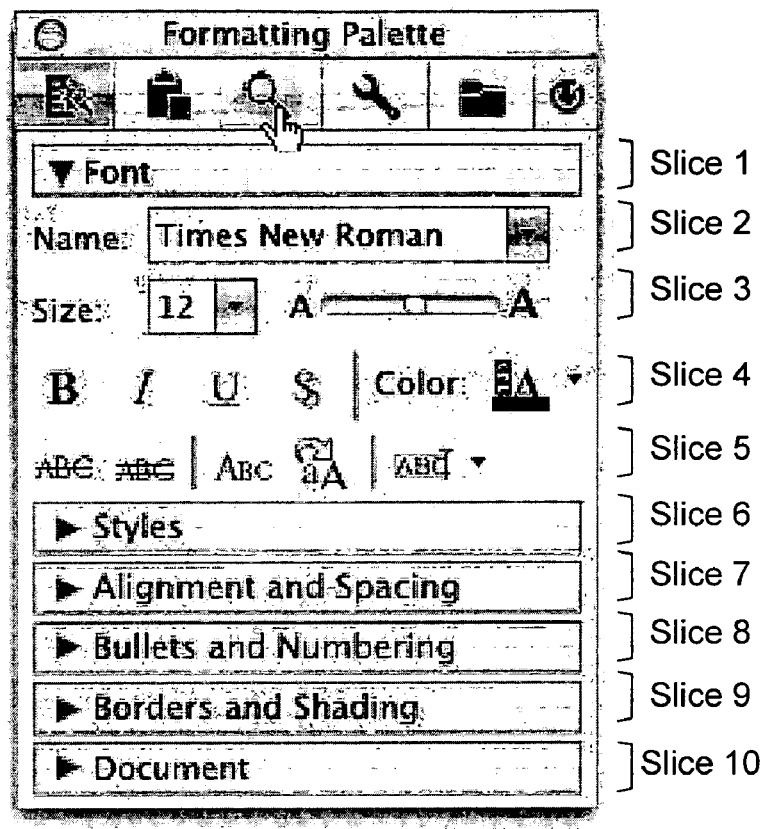

FIG. 5 provides one example of a suitable process for removing the action items in a non-linear fashion using animation. In step 300, the user interface is divided into slices. In some embodiments, each slice contains one action item. In other embodiments, a slice may contain more than one action item. In additional embodiments, a slice can contain a portion of an action item so that one action item is broken into multiple slices. In another embodiment, the user interface can be divided into a pre-defined number of equally sized slices. If the animation is to remove the action items by sliding them vertically to an edge of the user interface, then the user interface can be divided vertically into slices. Alternatively, the user interface can be divided horizontally or in another fashion. FIG. 5A depicts an example of the user interface divided into slices (e.g., Slice 0-Slice 10).

In step 302, the next slice of the user interface to be processed is accessed. If this is the first time that step 302 is being performed, then the first slice is accessed. In some embodiments, the first slice to be processed is that slice closest to the edge that the slices will slide into. In one implementation, the slices will slide into the the function selectors; therefore, slice 0 (see FIG. 5A) is the first slice to be accessed.

In step 304, the first slice is made to look stretched (e.g., blurred). For example, animation 256 of FIG. 4 shows slices appearing to be stretched. In step 306, the stretched slice is slid to the edge of the user interface so that it looks like the slice disappears off the user interface. In the example of FIG. 4, the slices slide up to the top edge (just below the function selectors). In some embodiments, the slices are first stretched and then slid. In other embodiments, the slices are stretched and slid concurrently, or in another order.

If the slice being accessed is not the last slice to be accessed (step 308), then the system will wait (step 312) until the slice being accessed passes a threshold sliding distance. For example, the system may wait until the slice has been slid 25% (or other percentage) of the total amount it needs to slide to be removed from the user interface. In other, embodiments, the threshold can be an absolute distance. The threshold distance can be zero (which would mean no waiting), 100% of the total distance (which would mean waiting until the slice is removed), or an amount in between. After step 312, the process loops back to step 302 and the next slice is accessed.

If (step 308) the slice being accessed is the last slice to be accessed (e.g., slice 10 of FIG. 5A), then the system will reduce the size of the user interface (e.g., user interface 230) in step 310. In some embodiments, the user interface will shrink concurrently with the sliding of the last slice. In other embodiments, the user interface will shrink after the last slice has been removed. In other embodiments, other timing can be implemented. The user interface may have multiple dimensions (e.g., length, height, depth, diameter, circumference, etc.). The reducing of size may include reducing one or more of the user interface's dimensions. After all the slices have been removed and the user interface has been reduced in size, the user interface will be in an intermediate state. In one embodiment, the intermediate state will include displaying the function selectors. For example, FIG. 4 shows intermediate state 262 with a row of function selectors.

FIG. 6 is a flow chart depicting an alternative embodiment for removing the action items in a non-linear fashion using animation. The process of FIG. 5 contemplates (in some embodiments) that multiple slices will be sliding at a given time, while the process of FIG. 6 contemplates only one slice sliding at a time. In step 350, the user interface is divided into slices. In step 352, the next slice of the user interface to be processed is accessed. If this is the first time that step 352 is being performed, then the first slice is accessed. In some embodiments, the first slice to be processed is that slice closest to the edge that the slice will slide into. In one implementation, the slices will slide into a top edge (just below of the function selectors), so slice 0 (FIG. 5A) is the first slice to be accessed.

If the current slice being accessed is not the last slice to be removed, then the process (at step 354) continues at step 360. In step 360, the current slice being accessed slides to the edge of the user interface so that it appears to slide off the user interface. After the slice slides off the user interface in step 360, the process continues at step 352 and the next slice is accessed.

If the current slice being accessed is the last slice to be removed (e.g., slice 10 of FIG. 5A), then the process (at step 354) continues at step 356. In step 356, the last slice slides to the edge of the user interface so that it appears to slide off the user interface. In step 358, the system will reduce the size of the user interface (e.g., user interface 230). In some embodiments, the user interface will shrink concurrently with the sliding of the last slice. In other embodiments, the user interface will shrink after the last slice has been removed. In other embodiments, other timing can be implemented. After all the slices have been removed and the user interface has been reduced in size, the user interface will be in an intermediate state (e.g., state 262 of FIG. 4).

Figure 7:
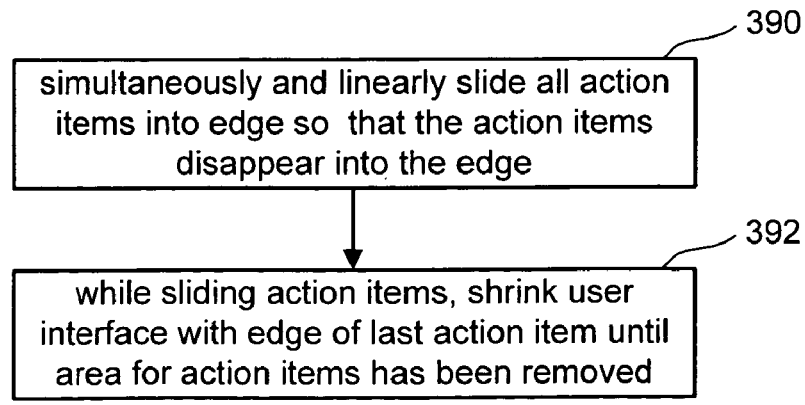
FIG. 7 is a flow chart describing an embodiment of a method for animating a user interface from an initial state to a first intermediate state.

FIG. 7 is a flow chart depicting an alternative embodiment for removing the action items using animation. In step 390, all action items (divided into slices or not divided into slices) simultaneously and linearly slide into an edge of the user interface so that they appear to slide off the user interface one-by-one. In step 392, the user interface is reduced in size. In one embodiment, the user interface is reduced in sized while sliding the action actions. In one implementation, an edge of the user interface can move with an edge of the last action item. For example, the bottom edge of user interface 220 of FIG. 3 can move in the vertical direction while action item 248 is slid in the vertical direction toward function selectors 222-232. In another embodiment, the user interface is reduced in sized after sliding the action items.

Figure 8:
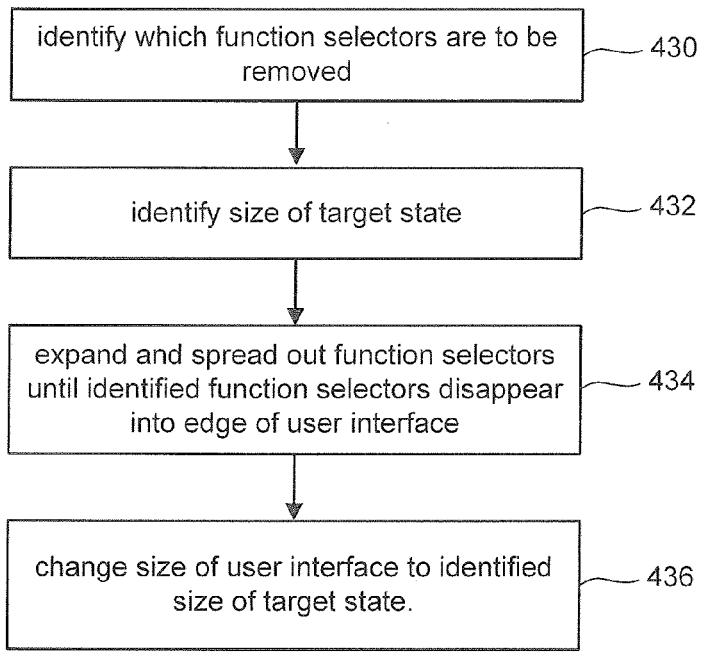
FIG. 8 is a flow chart describing an embodiment of a method for animating a user interface from a first intermediate state to a second intermediate state.
Figure 9:
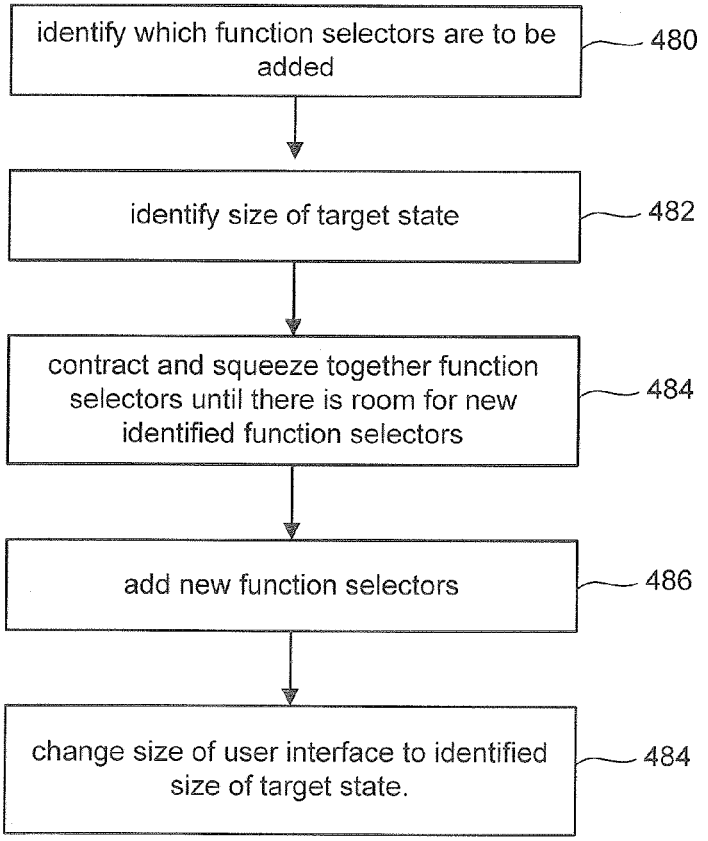
FIG. 9 is a flow chart describing an embodiment of a method for animating a user interface from a first intermediate state to a second intermediate state.

Looking back at FIG. 3, step 206 includes using animation to change the user interface from a first intermediate state to a second intermediate state. In one embodiment, the change from the first intermediate state to the second intermediate state can include adding function selectors and/or removing function selectors. FIG. 8 is a flow chart describing a process for removing function selectors and FIG. 9 is a flow chart describing a process for adding function selectors. In some cases step 206 of FIG. 3 includes performing the process of both FIG. 8 and FIG. 9, while in other cases only one of FIG. 8 or FIG. 9 is performed. In one embodiment, a configuration file can be used to indicate the details of the function selectors for each state so that it is known what function selectors to add, remove or change. In other embodiments, this information can be hard coded in software or hardware. Other means for determining how to add/remove/change function selectors can also be used.

In step 430 of FIG. 8, those function selectors that are to be removed are identified. In step 432, the size of the target state is determined. A two dimensional user interface may have a width and height based on the number of function selectors and/or action items. This length and width of the target state is determined at step 432. In alternative embodiments, only a subset of dimensions are determined in step 432, for example, only those one or more dimensions effected by the function selectors. Interface other than two dimensional interfaces can also be used. In step 434, the function selectors that are to remain are expanded in size and spread out, causing those function selectors that should be removed to disappear off the user interface. In one embodiment, the functions selectors that are to be removed had been placed at the end of the row, therefore, enabling them to slide off the user interface. In other embodiments, the function selectors can slide off the interface from the middle of the row (in any convenient direction) or otherwise disappear (e.g., dissolve). In some embodiment, the function selectors that are not being removed will not expand and/or spread out when removing other function selectors. In step 436, the size (or other attributes) of the user interface may (optionally) be changed to reflect one or more of the dimensions identified in step 432.

In step 480 of FIG. 9, those function selectors that are to be added are identified. For example, a configuration file can be accessed, code can be accessed, etc. In step 482, the size of the target state is determined. For example, the length and width of the target state is determined at step 432. In alternative embodiments, only a subset of dimensions are determined in step 432, for example, only those one or more dimensions effected by the function selectors. Note, however, that the user interface need not be rectangular or any other particular shape. In step 484, the pre-existing function selectors are contracted in size and squeezed together to make room for new function selectors. In step 486, the new function selectors are added to the user interface. Note that in some embodiments, new function selectors are added without contracting and squeezing the pre-existing function selectors. In step 484, the user interface may (optionally) change size to reflect one or more of the dimensions identified in step 482.

There are various methods for performing the animation of step 208 of FIG. 2, which pertains to changing the user interface from the intermediate stage to the target state. In one embodiment, step 208 includes adding action items to be used for the target state and adjusting the size of the user interface to accommodate the target state. In some embodiments, the animation for adding the action items is performed in a non-linear fashion.

Figure 10:
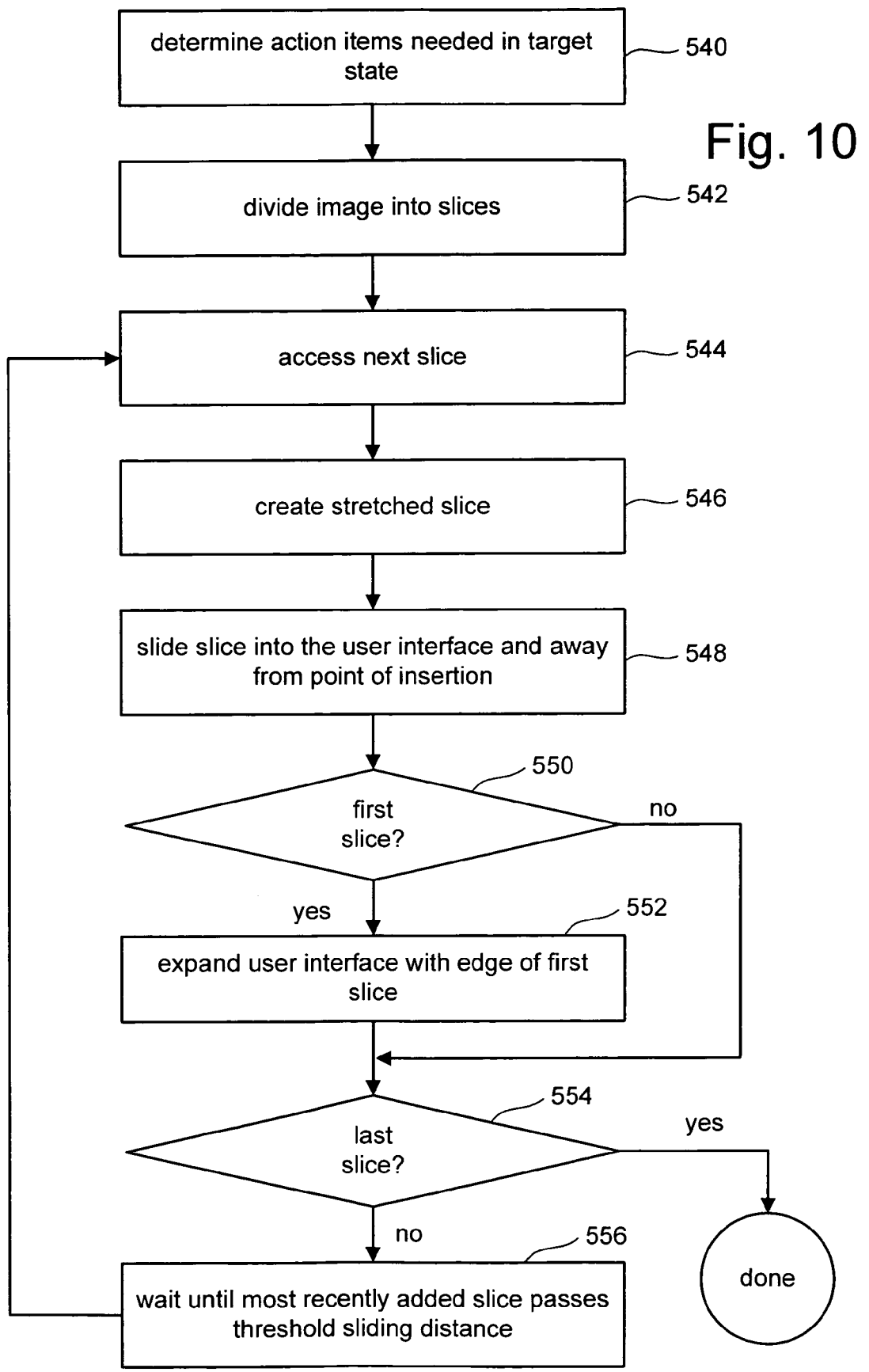
FIG. 10 is a flow chart describing an embodiment of a method for animating a user interface from an intermediate state to a target state.

FIG. 10 is a flow chart describing one embodiment for animating the changing of the user interface from the intermediate stage to the target state. In this embodiment, the action items are added to the user interface in a non-linear fashion. In step 540, a determination is made as to which action items need to be added to the user interface. In one implementation, a configuration file stores an indication of which action items are used by the states of the user interface. In other implementations, the information can be hard coded in software or hardware, or other means can be used. In step 542, the image of the final target state is divided into slices. The slices can be equal in area, equal in number of action items, or divided according to another set of criteria. In step 544, information for the next slice is accessed. If this is the first time that step 544 is performed, then the first slice would be accessed. In one example, the first slice corresponds to the slice that is added to the user interface first, which can be that slice furthest from the point if insertion. Looking at FIG. 5A, for example, slice 10 may be the first slice added, assuming that slices are added near the function selectors and slide down to the bottom of the user interface.

A visual representation is created for the slice accessed in step 542. In one embodiment, this visual representation appears to be stretched (e.g., blurred) such as depicted in animation 270 of FIG. 4. In step 548, the slice is added to the user interface and slid away from point of insertion. For example, the stretched slice may be inserted just below the function selectors. In other embodiments, other locations can be used for the point of insertion. The slice is added by making it appear to slide into the user interface at the point of insertion. The slice then keeps sliding away from the point of insertion until it reaches its final position in the user interface. Once the slice reaches its final position, its appearance is changed so that it no longer looks stretched (e.g., blurred). If the slice being operated on in steps 544-548 was the first slice (see step 550), then the user interface is expanded in step 552 while the slice is being added and slid away from the insertion point. For example, the edge of the user interface may be moved so that it is always a pre-set number of pixels from the edge of the slice. If the slice being operated on in steps 544-548 was the last slice (see step 554), then the process of FIG. 10 is complete. If the slice being operated on in steps 544-548 was not the last slice (see step 554), then the process will wait until the slice being slid in step 548 passes a threshold sliding distance in step 556. That is, the next slice will not be added to the user interface until the previous slice has slid a minimum distance. The threshold distance can be zero (which would mean no waiting), 100% of the total distance (which would mean waiting until the sliding of the slice has completed), or an amount in between. After step 556, the process loops back to step 544 and the next slice is accessed.

Figure 11:
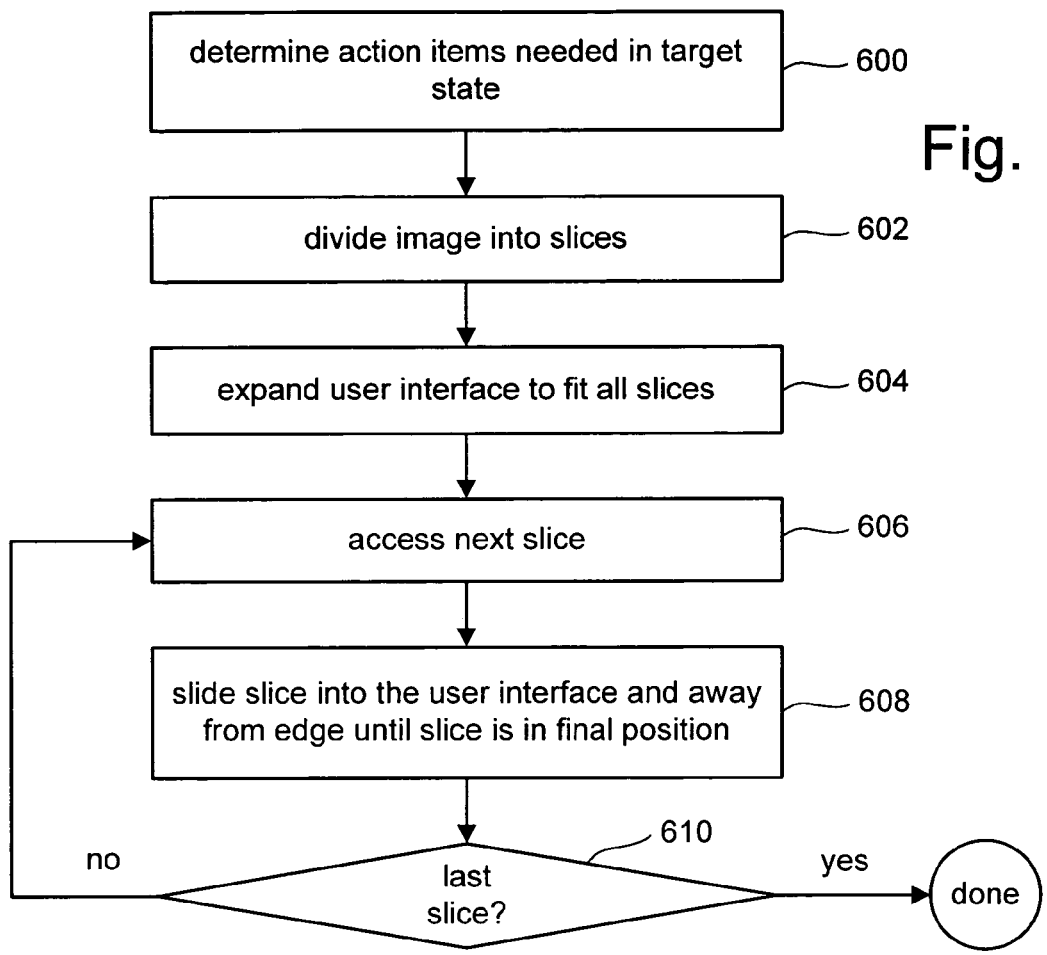
FIG. 11 is a flow chart describing an embodiment of a method for animating a user interface from an intermediate state to a target state.

FIG. 11 is a flow chart describing another embodiment of a process for animating the changing of the user interface from the intermediate stage to the target state. In this embodiment, the action items are added to the user interface in a non-linear fashion. One difference between the process of FIG. 10 and the process of FIG. 11 is that the process of FIG. 11 first expands the user interface to fit all slices and then adds the slices one at a time. On the other hand, the process of FIG. 10 expands the user interface while the slices are being added/slid.

In step 600 of FIG. 11, a determination is made as to which action items need to be added to the user interface. In one implementation, a configuration file stores an indication of which action items are used by the states of the user interface. In other implementations, the information can be hard coded in software or hardware, or other means can be used. In step 602, the image of the final target state is divided into slices. The slices can be equal in area, equal in number of action items, or divided according to another set of criteria. In step

604, the user interface is expanded to the size needed for the target state to accommodate all of the action items. In step 606, information for the next slice is accessed. If this is the first time that step 606 is performed, then the first slice would be accessed. In step 608, the accessed slice is added by making it appear to slide into the user interface at the point of insertion. The slice then keeps sliding away from the point of insertion until it reaches is final position in the user interface. If the slice being operated on in steps 606-608 was the last slice (see step 610), then the process of FIG. 11 is complete. If the slice being operated on in steps 606-608 was not the last slice, then the process loops back to step 606 and the next slice is accessed.

Figure 12:
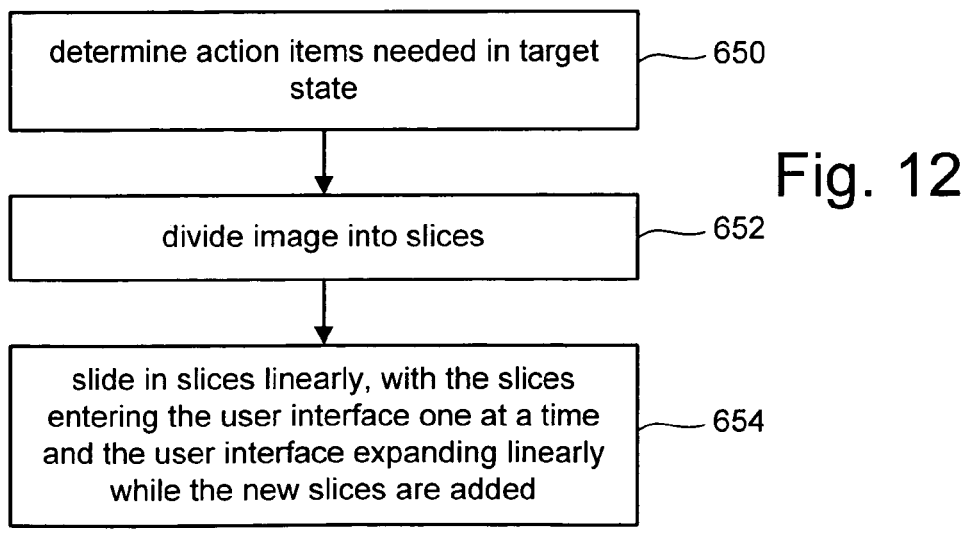
FIG. 12 is a flow chart describing an embodiment of a method for animating a user interface from an intermediate state to a target state.

FIG. 12 is a flow chart describing another embodiment of a process for animating the changing of the user interface from the intermediate stage to the target state. In this embodiment, the action items are added in a linear fashion. In step 650, a determination is made as to which action items need to be added to the user interface. In step 652, the image of the target state is divided into slices. In step 654, the slices are added to the user interface in a linear fashion. The slices are added to the user interface one at a time. All of the visible slices are moved together while the user interface is expanded to accommodate the slices being added and moved. Note that other methods for adding action items can also be used.

In some embodiments, when action items are added or removed, the speed at which they slide may change. For example, after an action item begins to slide, its speed of siding may increase. In some implementations, the speed may decrease as the action item reaches the end of the sliding process.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. One or more processor readable storage devices having processor readable code embodied on said processor readable storage devices, said processor readable code for programming one or more processors to perform a method comprising:

displaying a user interface in an initial state associated with a first function selector, said user interface displays:

a function selector tool bar including the first function selector and other available function selectors, each function selector represented by an icon such that the function selector tool bar includes a horizontal arrangement of icons and occupies a width of the user interface; and a first set of one or more action selectors each having substantially the same width as the function selector tool bar, wherein each action selector, when selected, displays selectable action items for performing an action associated with said selected action selector;

receiving a request to change said user interface from the initial state to a target state associated with one of the other available function selectors displayed in the function selector tool bar;

in response to said request, changing said user interface from said initial state to an intermediate stage using a first animation, said first animation includes blurring said first set of one or more action selectors and collapsing the blurred action selectors into the function selector tool bar so that the action selectors appear to slide individually into the function selector tool bar until the blurred action selectors are no longer visible; and changing said user interface from said intermediate stage to said target state using a second animation, said second animation includes sliding a second set of one or more action selectors away from the function selector tool bar into a final position, the second set of action selectors, when selected, each display selectable action items for performing an action associated with the selected action selector.

2. One or more processor readable storage devices according to claim 1, wherein:

said first animation includes reducing said user interface's size while removing said first set of action selectors; and said second animation includes increasing said user interface's size while adding said second set of action selectors.

3. One or more processor readable storage devices according to claim 1, wherein said first animation includes:

dividing said action selectors displayed in said user interface into slices;

collapsing each slice individually into the function selector tool bar; and reducing a size dimension of said user interface.

4. One or more processor readable storage devices according to claim 1, wherein said first animation includes:

dividing said action selectors displayed in said user interface into slices; and collapsing each slice into the function selector tool bar in a non-linear fashion.

5. One or more processor readable storage devices according to claim 1, wherein said first animation includes:

dividing said action selectors displayed in said user interface into slices; and collapsing the slices into the function selector tool bar simultaneously.

6. One or more processor readable storage devices according to claim 1, wherein said second animation includes:

dividing said second set of action selectors into slices;

sliding a first slice away from the function selector tool bar and into the user interface;

increasing a size dimension of said user interface; and sliding adding additional slices into the user interface after increasing said size dimension of said user interface.

7. One or more processor readable storage devices according to claim 1, wherein said second animation includes:

dividing said second set of action selectors into slices;

blurring said second set of action selectors;

increasing a size dimension of said user interface; and sliding said blurred slices away from said function selector tool bar into said user interface.

8. A method for providing an interface, comprising:

displaying a user interface including a first portion and a second portion, the first portion displays a function selector tool bar containing multiple function selectors each represented by an icon such that the function selector tool bar includes a horizontal arrangement of icons and occupies a width of the user interface, the second portion displays one or more action selectors each having substantially the same width as the function selector tool bar and each associated with the function selector currently selected in the function selector tool bar, each action selector, when selected, displays selectable action items for performing an action associated with said selected action selector, wherein an initial state of the user interface is associated with a first function selector;

receiving a request to change said user interface to a target state associated with a second function selector in the function selector tool bar; and changing said user interface from said initial state to said target state by, sliding each action selector associated with the initial state of the user interface individually into the function selector tool bar until all action selectors associated with the initial state are removed from the user interface; and sliding each action selector associated with the target state into the second portion of the user interface individually into a final position.

9. A method according to claim 8, wherein:

each action selector, when selected, displays selectable action items for performing an action associated with the selected action selector.

10. A method according to claim 8, further including:

blurring the action selectors associated with the initial state of the user interface prior to sliding each action selector associated with the initial state of the user interface individually into the function selector tool bar.

11. A method according to claim 8, further including:

blurring the action selectors associated with the target state of the user interface prior to sliding each action selector associated with the target state of the user interface individually into the final position.

12. An apparatus, comprising:

an interface device;

a storage device; and one or more processors in communication with said storage device and said interface device, said one or more processors provide for displaying a user interface in a first state, said first state is associated with a first function selector, said user interface displays a function selector tool bar including the first function selector and other function selectors, each function selector represented by an icon such that the function selector tool bar includes a horizontal arrangement of icons and occupies a width of the user interface, and further displays a first set of one or more action selectors each having substantially the same width as the function selector tool bar, wherein each action selector, when selected, displays selectable action items for performing an action associated with the selected action selector, said processor receives a request to change said user interface from the first state to a second state associated with one of the other function selectors in the function selector tool bar, in response to said request said processor performs a method comprising:

changing the user interface from the first state to an intermediate state using a first animation includes blurring the first set of action selectors and collapsing the blurred action selectors into the function selector tool bar so that the action selectors appear to slide individually into the function selector tool bar until the blurred action selectors are no longer visible; and changing the user interface from the intermediate state to the second state using a second animation, the second animation includes sliding a second set of action selectors away from the function selector tool bar into a final position, the second set of action selectors, when selected, each display selectable action items for performing an action associated with the selected action selector.

13. An apparatus according to claim 12, wherein:

said second animation further changes a size dimension of said user interface.

\* \* \* \* \*